Oct. 6, 1970    C. H. F. COLLINS    3,532,856
ELECTRIC THERMAL STORAGE HEATERS AND/OR HEATING
UNITS USED IN SAID HEATERS
Filed Sept. 4, 1968    5 Sheets-Sheet 5

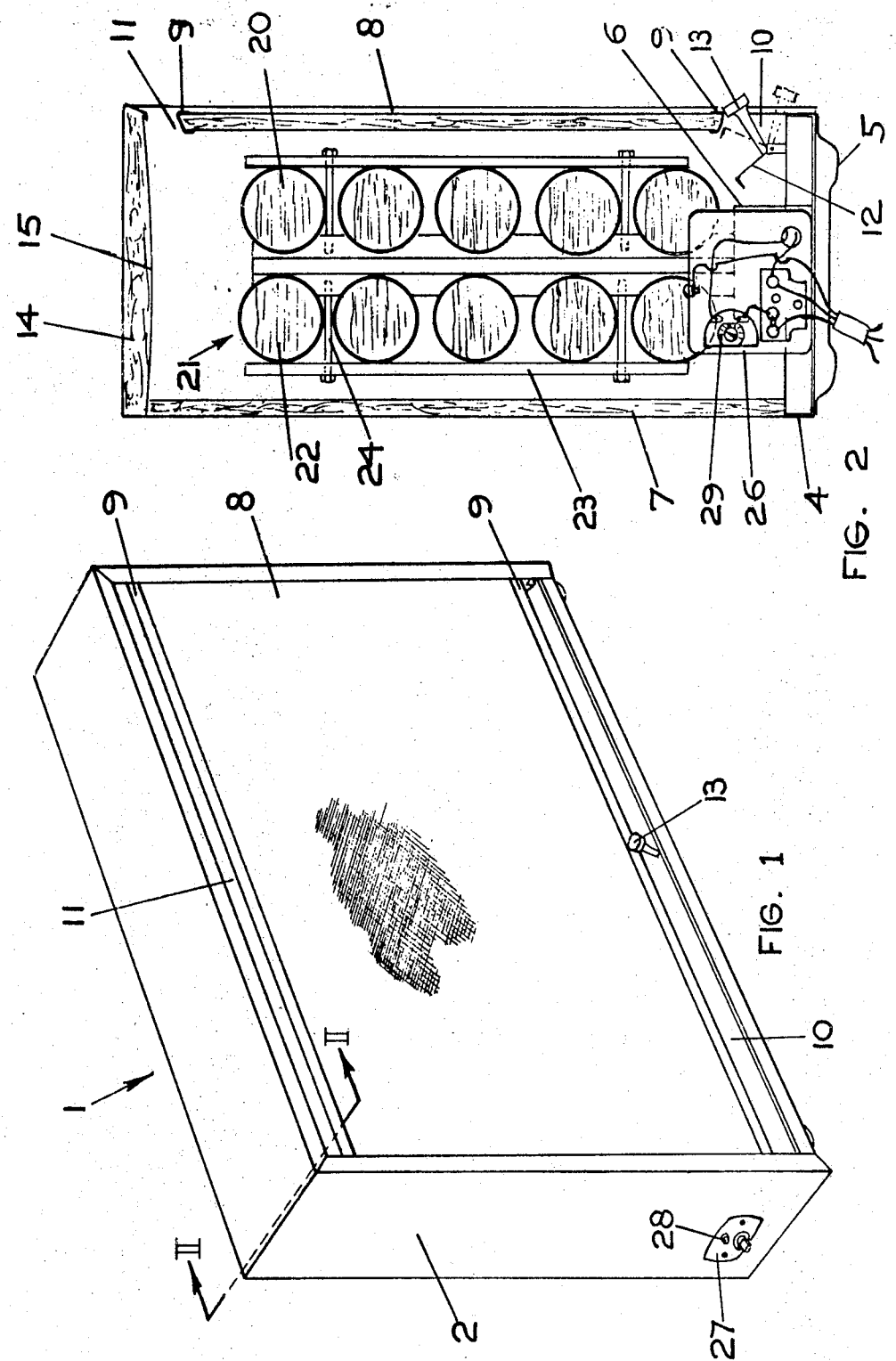

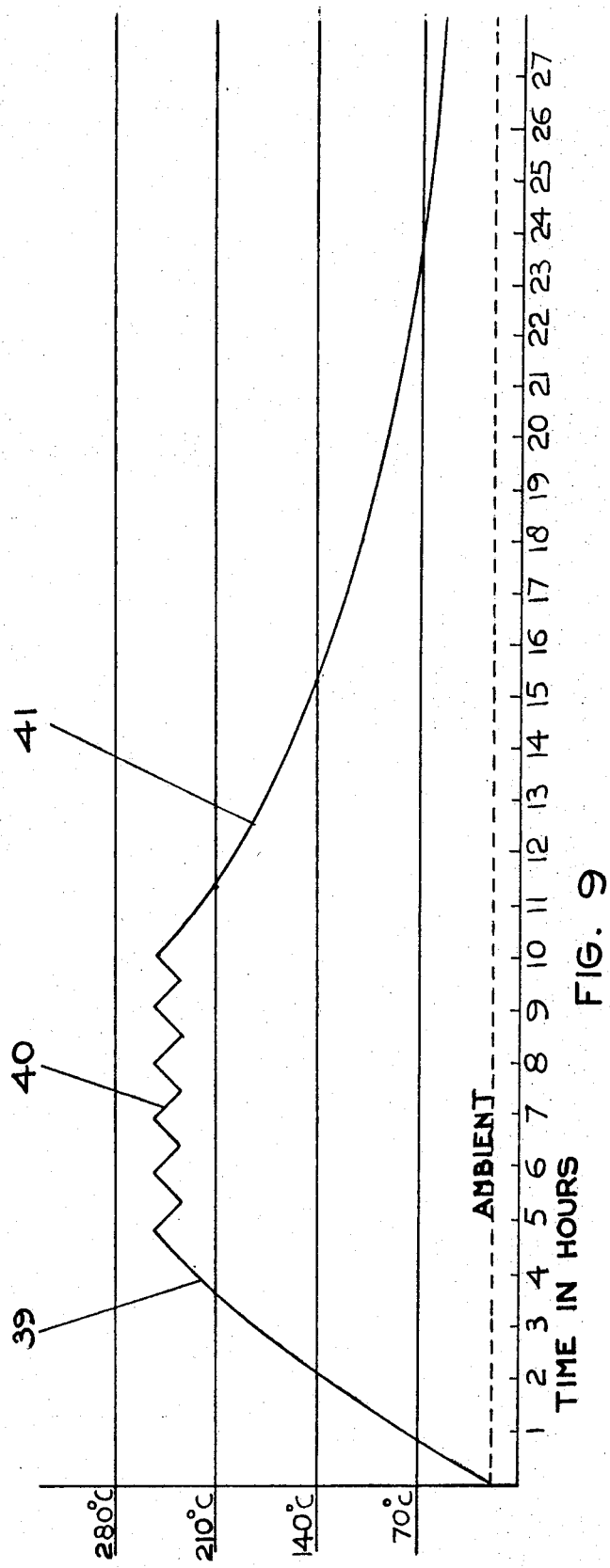

United States Patent Office
3,532,856
Patented Oct. 6, 1970

3,532,856
ELECTRIC THERMAL STORAGE HEATERS AND/ OR HEATING UNITS USED IN SAID HEATERS
Clyde H. F. Collins, 16 Brougham St.,
Christchurch, New Zealand
Filed Sept. 4, 1968, Ser. No. 757,264
Claims priority, application New Zealand, Sept. 5, 1967,
149,967
Int. Cl. H05b 1/00
U.S. Cl. 219—325                    15 Claims

ABSTRACT OF THE DISCLOSURE

A thermal storage heater with a heating unit having a heat exchange member which functions as a heat sink during thermal charging and also operates to heat air passing thereover and a plurality of heat storage units associated with the heat exchange member to receive and store heat during thermal charging and give off heat during thermal discharge with the heat exchange member during the thermal discharge receiving heat from the heat storage unit and providing a greater heated surface area to enable recovery of the stored heat by a flow of air over the storage unit and the heat exchange member.

---

In order to allow electric power authorities to control peak demands it is desirable to provide an electrically energized heater which has some thermal storage capacity for use during the peak demand periods for electrical energy. With existing thermal storage heaters the electric element is normally embedded in a mass of storage material and there is thus a considerable delay after the thermal storage heater is energized before heat may be given out to warm the area being heated. Such a construction is typified by the cast concrete block having electric heating element embedded therein. When the storage heater is energized it is necessary for the element to heat the concrete block before heat will be given out by the outer surface thereof. There is thus a considerable delay before a boost of heat can be given to a room being heated even after the heat storage heater is re-energized following a period of thermal discharge.

Also it has been recognised that there are certain advantages to be gained by using a heat storage material which will use the latent heat off usion for part of the thermal storage capacity. Previous heaters have been proposed using such storage means, for example, see U.S. Pat. No. 3,356,828. Such a construction has the serious disadvantage of providing a large mass of material to be heated in a container and in use the differential of temperature through the storage material is such that it is difficult to introduce the heat into the heat storage material while keeping the area of maximum heat of the storage units within acceptable limits. Thus it is difficult to efficiently utilize the potential storage of the heat storage material.

It is therefore an object of the present invention to provide an electric thermal storage heater and/or a heating unit used in the heater which will provide some thermal storage capacity for use during a de-energized period and at the same time will allow heat to be quickly utilized upon electrical energy being supplied to the heater.

It is a further object of the present invention to provide an electric thermal storage heater and/or a heating used in said heater which will allow heat to be readily stored in thermal storage units and recovered from said thermal storage units during a thermal discharge period.

It is a further object to provide an electric thermal storage heater or heating unit used in said heater which will utilize a storage material relying in part upon the latent heat of fusion for its thermal storage capacity without creating any substantial temperature variation through the mass of storage material being heated.

These and other objects of the present invention will appear from the following description and drawings of which are by way of exemplification of preferred embodiments of the present invention.

Figure 3:
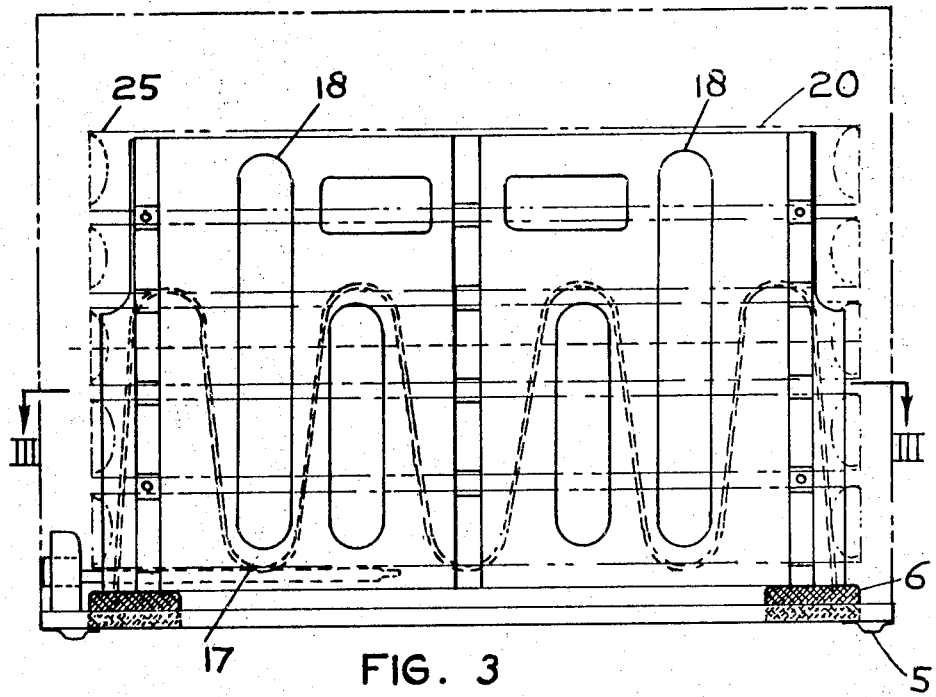
Figure 4:
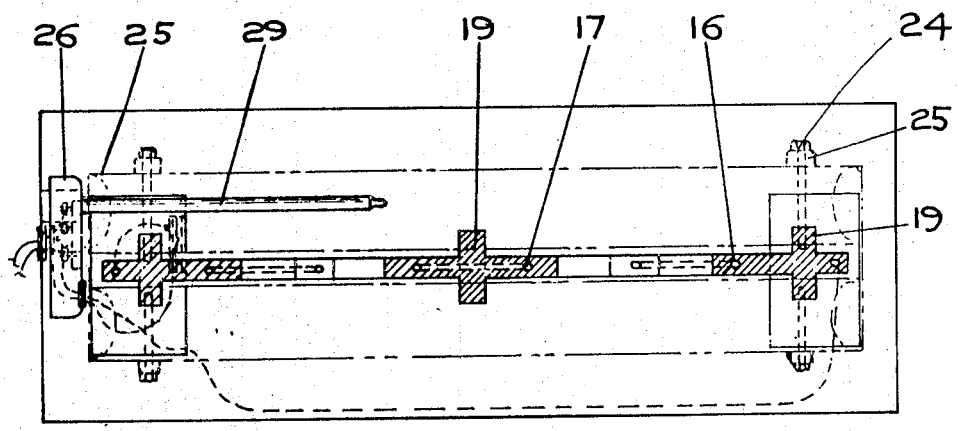
Figure 5:
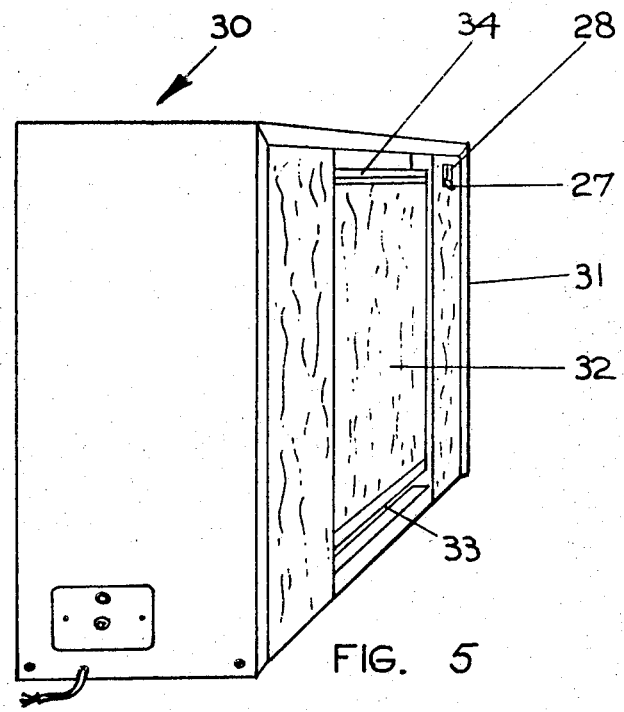
Figure 6:
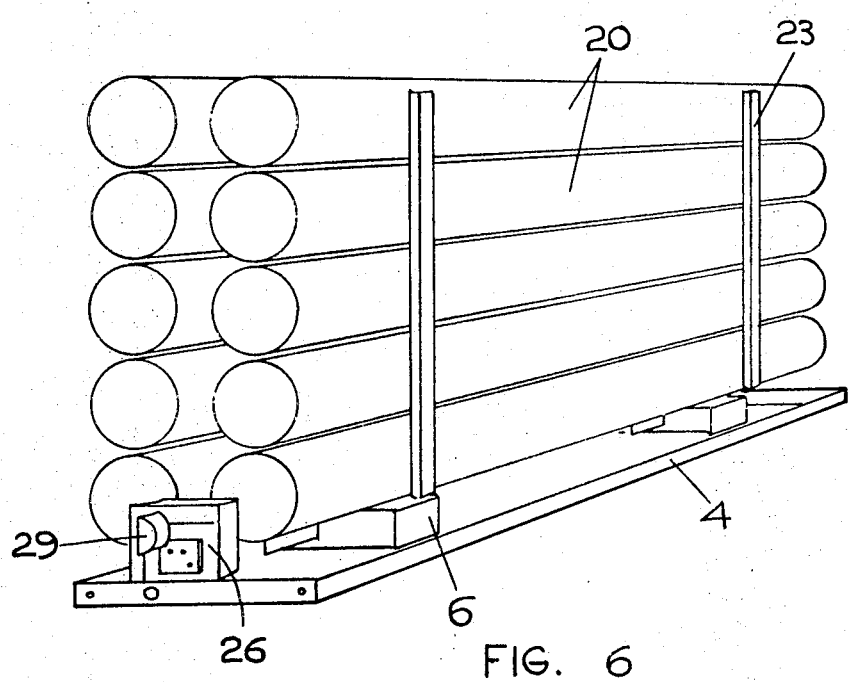
Figure 8:
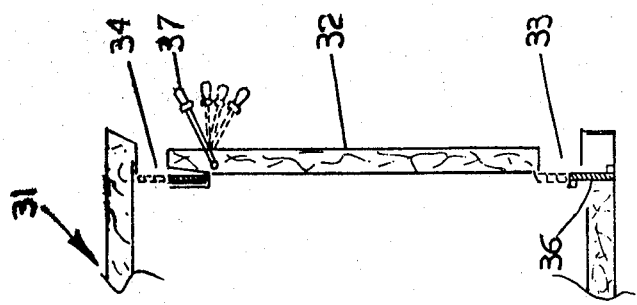
Figure 7:
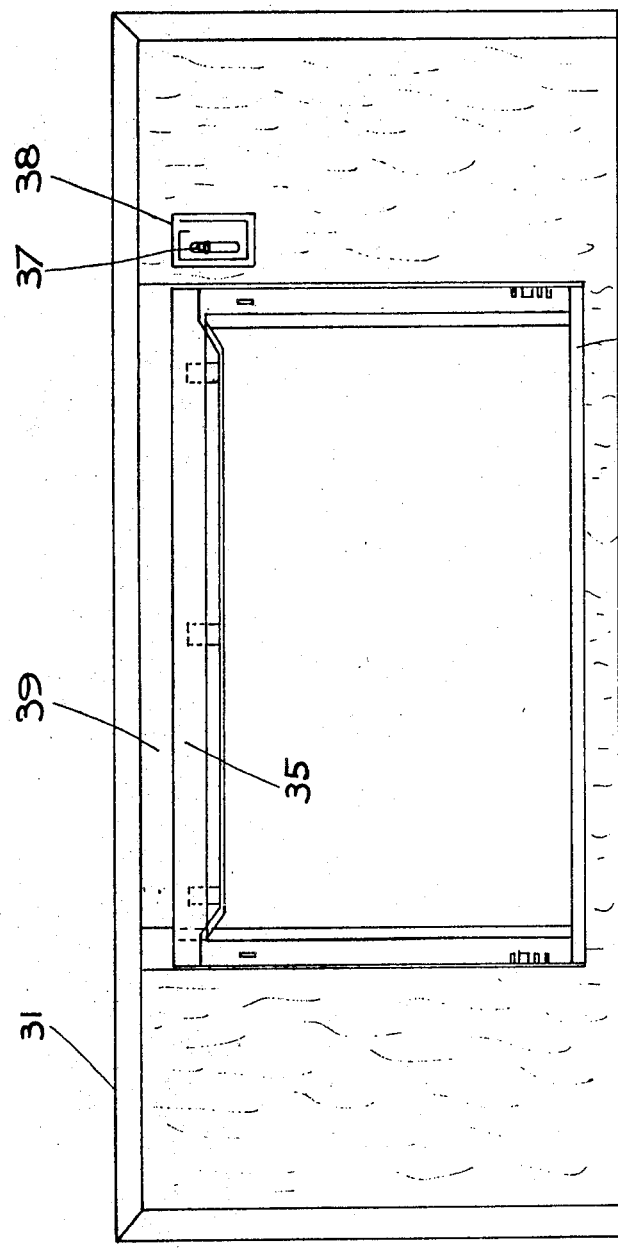

FIG. 1 is a perspective view of one model of an electric thermal storage heater according to the present invention, FIG. 2 is a cross sectional and elevation through II—II of FIG. 1, FIG. 3 is a front elevation showing the base of the housing and the heat exchange member of the heating unit with the heat storage units shown in dotted outline, FIG. 4 is a plan view through III—III on FIG. 3 again showing the heat storage units in dotted outline, FIG. 5 is a perspective view of an alternate model of a thermal storage heater according to the present invention, FIG. 6 is a perspective view of the heat storage unit used in the heater illustrated in FIG. 5, FIG. 7 is a front elevation of the heater in FIG. 5 with the front panel removed to show the control flap, FIG. 8 is a sectional side elevation through the control flap shown in FIG. 7, and FIG. 9 is an illustrative graph showing a typical thermal charge and discharge curve of a heating unit according to the present invention.

In one preferred form of the invention illustrated in FIGS. 1 to 4 of the accompanying drawings an electric thermal storage heater 1 comprises an outer housing 2 surrounding and supporting an inner heating unit 3. The housing 2 includes a base 4 preferably formed from folded sheet metal having feet or supporting members 5 of any convenient design. Mounting brackets 6 are fixed to and extend from the inner surface of the base 4 and the heating unit 3 is arranged to be fixed thereto.

The remainder of the housing 2 is provided by an outer casing 7 of generally rectangular form having an acceptable aesthetic finish on the outer surface. The front panel 8 may consist of a decorative panel for example a vinyl coated panel having trimming strips 9 at the top and bottom thereof. Air ingress and egress means are provided through the housing by a lower duct 10 extending across the front of the housing below the front panel 8 and an upper outlet duct 11 extending across above the decorative panel 8 as illustrated in FIG. 1.

An air flow control means is provided by a flap 12 pivotally supported to operate in association with the lower duct 10 to move from a position as indicated in dotted outline in FIG. 2 closing the duct 10 to a position indicated in full in FIG. 2 where the duct 10 is open. A weighted or counterbalancing operating knob 13 is attached to the flap to project through the duct 10 so that an operator can easily control the flap.

The housing is insulated by a layer of insulating material and preferably a layer of fibreglass 14 approximately one inch thick around the housing. The fiberglass is provided in the base as well as the sides and top of the housing. An inner lining 15 holds the fibreglass in place and preferably consists of a metal lining for example a lightweight aluminium or aluminium alloy sheet having a reflective surface to assist in retaining the heat within the housing. It will be appreciated that the dimensions of the housing are not critical but in one preferred embodiment as illustrated the housing is approximately two feet three inches long, one foot nine and a half inches in height and ten inches in depth. The air duct 11 is approximately three-eighths of an inch in width and the air inlet 10 is approximately an inch and a half in width.

The heating unit 3 comprises a heat exchange member 16 preferably provided as a cast metal panel vertically supported in use from the mounting brackets 6. The heat exchange member is formed as a cast aluminum member in which is embedded an electric heating element 17. The electric heating element 17 preferably comprises a 1500 watt mineral insulated copper clad element wire with electrical connections provided by terminals projecting from below the heat exchange member adjacent the ends thereof preferably in the area beneath the support brackets 6. This allows the terminals to be more effectively guarded for safety reasons in the completed construction. The electric heating element passes through the heat exchange member 16 in a wave or substantially sinusoidal form as illustrated in FIG. 3. The element extends from adjacent the base of the heat exchange member 16 over at least half and preferably approximately two thirds of the height of the heat exchange member. The upper portion of the heat exchange member is effectively heated by the transfer of heat through the heat exchange member in use.

A plurality of ducts 18 are cast in the heat exchange member 16 to provide passages which will operate as air ducts allowing the flow of air to be heated to pass in association with the heat exchange member. An acceptable pattern of ducts is illustrated in FIG. 3 but it will be appreciated that various modifications may be used if so desired.

The heat exchange member 16 includes mounting flanges 19 to assist in supporting heat storage units 20. Preferably three pairs of mounting flanges, that is, flanges extending from either side of the heat exchange member 16 are provided to support heat storage units 20 in association with the heat exchange member.

The heat storage units 20 comprise elongated containers arranged to be supported adjacent the face of the heat exchange member 16. The containers 21 are arranged to contain a heat storage material and preferably a heat storage material which utilizes the latent heat of fusion for thermal storage. A storage material 22 which has acceptable properties is microcrystalline wax. Other suitable heat storage materials include petroleum sludge, a suitable plastics resin or polymer or mixture of the foregoing or crystals of sodium hydroxide or other compounds known as being suitable for use as heat storage materials relying on the latent heat of fusion of the materials.

It is also to be noted that while considerable advantages do follow by using a storage material relying on the latent heat of fusion for thermal storage capacity in some instances an acceptable heating unit with thermal storage properties could be obtained where the heat storage units are made of a material which merely relies on specific heat for heat storage capacity.

The container 21 is preferably a tubular container which in use is mounted substantially horizontally on the heat exchange member 16. The flanges 19 have semicircular depressions formed therealong and the tube is arranged to engage in the depressions. A clamping bar 23 passes up the outside of the bank of tubes and studs 24 hold the bar 23 and thus the tubes 21 in association with the heat exchange member 16.

The diameter of the tubes may be varied to suit individual requirements but where a heat storage material relying on the latent heat of fusion we have found it is desirable to provide a tube having a diameter less than four inches and preferably between two and a half and three and a half inches. In order to strengthen the container 21 and the end caps 25 shown in dotted outline in FIGS. 3 and 4 are domed inwardly with the peripheral flanges of the end cap arranged to be welded to the end of the tube preferably under a shield of inert gas, for example, with argon arc welding. The end cups could also be domed outwardly. The containers 21 so formed are very strong but the volume of heat storage material filled into the container is such that an ample expansion space is allowed when the heat storage material changes from the solid to the liquid phase.

The number of heat storage units 20 fixed to each side of the heat exchange member 16 can be varied but preferably between three and ten containers are fitted in association with each heat exchange member. In the preferred example five containers are supported on either side of the heat exchange member.

The wattage of the electric heating element can be varied dependent upon the size of the heat exchange member and the size of the containers being heated. The energy supplied to the preferred unit above described is 1500 watts. The mass of the aluminum is approximately twenty pounds and where a bank of five tubes is provided on each side of the heat exchange member 16 the tubes are filled with approximately thirty to fifty pounds of microcrystalline wax or other heat storage material selected.

A control panel 26 for the necessary electrical connections and control equipment is provided at one end of the housing and towards the base thereof as is illustrated in FIGS. 2, 3 and 4. The control panel 26 allows for the necessary electrical connection to be made to energise the electrical heating element 17 and also to operate through a control switch 27 mounted on the outside of the housing 2 as illustrated in FIG. 1. The switch 27 includes a neon indicating light 28 so that a user is aware when the electrical energy is being supplied to the heater.

A thermostat 29 extends from the panel 26 so that the sensor is positioned immediately beneath one of the lower heat storage units 20. The thermostat acts as a control and is set so that electrical energy will be cut off when the unit is charged to a predetermined level.

In order to use the present invention the thermal storage heater 1 is placed in an area to be heated and is connected to a source of electricity. The source of electricity will be controlled through relays so that the leectrical energy will not be supplied to the heater during peak demand periods. During the thermal charging period the electrical element is energized and the heat exchange member functions as a neat sink to dissipate heat from the embedded electric element to the surfaces of the heat exchange member. The heat is then transferred by conduction, convection or radiation to heat the heat storage units and the air in the housing. Even where the flap 12 is closed there will be a certain spillage of heat through the top duct 11 into the room providing a degree of background warmth. Also even with the installation some heat will be radiated from the housing itself. However, the flow of heated air will be slight until the flap is opened when a considerable flow of air can be caused to pass over the heating units and be discharged through the top duct. The air can contact almost the entire surface area of the heat storage units and also a substantial part of the heat exchange member.

During a thermal discharge period for example when the electric element is not energized the heat will be taken from the heat storage members and also from the heat exchange member which will receive heat back from the heat storage members and provide a greater area of heated surface over which the air has to pass during passage over the heating unit. In this way an extremely effective recovery of heat is possible from the storage units.

Assuming the period during which the power is shut off is almost sufficient to discharge the stored heat from the heating unit the user may require a boost to the temperature of the area being heated when the power is restored. This may be easily achieved because the heat exchange member will be quickly heated up and will heat the air passing thereover. With the present invention there will be no lengthy delay while the mass of the storage material is being heated to a temperature such that the outer surface thereof will give off a supply of heat into the area being heated.

A slightly modified electric thermal storage heater 30 is illustrated in FIGS. 5 to 8 of the accompanying drawings. The modified heater basically retains the same components as the heater previously described but has been developed to provide a greater capacity for storing heat. To this end the housing 31 is longer and has a central panel 32 with air ducts 33 and 34 to control the passage of air through the housing 31 in a similar manner to that previously described.

The air flow control means enables a more accurate control of the flow of air through the heater and to this end flaps 35 and 36 are ganged to operated together by a multipositioned control member 37 to vary the opening of the ducts 33 and 34. The operating member projects through an indicator panel 38 so that a user may set the number 37 and thus control the size of the duct through which air may pass dependent upon the amount of heat required. A scale on the panel 38 may for example show "Low," "Warm," "Hot," "Closed," etc.

In the modified construction the heating unit is substantially the same as that previously described except the storage units are longer and project beyond either end of the heat exchange member. A larger heat exchange member could be used but we have found that the present heat exchange member operates effectively and for manufacturing reasons it is convenient to retain the same heat exchange member for such heater.

The flap control illustrated in FIGS. 7 and 8 of the drawings is dependent upon manual operation. We believe that in some instances it is desirable for a further control to be operated based upon the heat stored in the heater and possibly the ambient room temperatures rather than the human operator so that a more effective and even distribution of the heat can be achieved. To this end two further control devices could be used. First a flap operated in a manner somewhat similar to that illustrated in FIGS. 7 and 8 may be used but the position thereof would be controlled by an actuating means operated by a room thermostat. Thus as the room temperature drops the flap would be opened to allow more heat to be discharged into the room. If the manual control was connected to the same control flaps the operating mechanism would be such that in manual operation the flaps could not be opened beyond that set by the room thermostat although the flap could be closed manually if a user was not using the area being heated.

An additional control which may be incorporated operates on the amount of heat stored. If the control flap is opened the heater will tend to discharge a large portion of the heat stored therein over the initial period. As the temperature in the heater drops, that heat output will also be reduced. To this end a temperature sensitive actuating member would be connected to the heating unit and would operate either the control flaps at present manually controlled or a supplementary set of control flaps. The temperature sensitive device would restrict the opening and when the unit was fully charged the opening could not be increased beyond a certain maximum which would be fixed by the temperature sensitive device. As the heat in the storage unit was given off the temperature sensitive device would adjust to allow the flap to be opened more widely under the control of the manual lever if the same flap was being controlled.

Two such temperature sensitive devices may be used. First a bi-metal coiled member associated with one of the heat storage units could be attached to actuate the flap through a series of levers. Secondly a bimetallic torsion member arranged to operate with a twisting motion could be used but would be suspended from the top of the housing and once again connected through appropriate operating levers to operate the flap valve. As stated above by using the additional controls mentioned the heat stored may be given out more evenly over a period of time.

A typical graph showing the temperature in a thermal storage heater according to the present invention is illustrated in FIG. 11. The graph indicates an initial heating period 39 when energy is being supplied to the electric element. The saw tooth pattern 40 at the top of the graph illustrates the thermostat in operation while electrical energy is still available but when the heating unit is fully charged and only a slight heat spillage is given off into the room being heated. The cooling down curve 41 is then illustrated when the electrical energy is shut off from the unit and the stored heat is given out over a period in excess of ten hours. In normal operation the power would again be supplied to the heater during this period to recharge the heater to the fully charged position as illustrated by the saw tooth portion of the graph.

The present invention has been described in relation to thermal heat storage units which can be positioned in the area being heated as individual heating units.

The present invention also has application to provide a central source of heat energy for a central heating system. Thus a plurality of heating units according to the present invention may be combined to operate together an appropriate position in a house or other building to be heated. Heated air could be ducted to the rooms being heated in the conventional manner and a fan would be used to blow the air over the heating units. A control panel could be provided so that the number of heating units energized could be controlled by the operator but once again the supply authority would have power to shut off the electrical supply during peak periods.

A thermal storage heating unit or a heater incorporating the heating unit provides an extremely versatile means of heating which will provide the user with a maximum of comfort and convenience while still enabling the supply authorities to have control over the power supplied during the peak demand periods.

What I claim is:

1. An electric thermal storage unit comprising a metal heat exchange panel vertically positioned in use, an electric heating element embedded in said heat exchange panel, electrical connections to said element, a plurality of elongated heat storage units horizontally mounted on the side of said heat exchange panel, each said heat storage unit containing therein heat storage material relying on latent heat of fusion for heat storage and air flow passageways between part of said heat exchange panel and part of each of said elongated heat storage units.

2. A heating unit as claimed in claim 1 wherein each of said heat storage units comprises a tubular container arranged to hold said heat storage material and mounted in association with said heat exchange panel.

3. A heating unit as claimed in claim 2 wherein said heat exchange panel comprises a metal panel vertically positioned in use with a plurality of tubular containers mounted substantially horizontally on both sides of said metal panel.

4. A heating unit as claimed in claim 3 wherein said heat storage material is microcrystalline wax.

5. A heating unit as claimed in claim 4 wherein between three and ten and preferably five tubular heat storage containers are fixed to each side of said heat exchange member.

6. A heating unit as claimed in claim 5 wherein said metal panel has air ducts cast therein.

7. A heating unit as claimed in claim 6 wherein said heating element is embedded in said metal panel so that the upper part of the panel is not substantially hotter than the base with said heating element passing through the metal panel in a sinusoidal path extending from adjacent the base of the panel over part of the height thereof.

8. A heating unit for an electric thermal storage heater said heating unit comprising a heat exchange member vertically positioned in use, an electric heating element embedded in said heat exchange member, electrical connections to said element, a plurality of elongated heat storage units horizontally mounted on the side of said heat exchange member including therein a heat storage material relying on the latent heat of fusion for heat storage properties and selected from the group consisting of microcrystalline wax, petroleum sludge, plastic resins and crystals of sodium hydroxide, said heat storage units being supported on said heat exchange member and air flow passageways between part of said heat exchange member and part of each of said elongated heat storage units so that in use a flow of air over the unit is able to pass both over a heat storage unit and part of the heat exchange member.

9. An electric thermal storage heater comprising a housing, air ingress and egress means in said housing to allow a flow of air to pass through said housing, a heat exchange member mounted in said housing and vertically positioned in use, an electric heating embedded in said heating exchange member, a plurality of elongated heat storage units horizontally supported on the side of said heat exchange member, and air passageways between part of said heat exchange member and part of said elongated heat storage units so that in use a flow of air is able to pass through said air ingress means and over said heat storage unit and part of said heat exchange member before being discharged from said air egress means.

10. A storage heater as claimed in claim 9 wherein air-flow control means are provided to control the flow of air through said housing.

11. A storage heater as claimed in claim 10 wherein said housing includes a front panel, said air ingress means comprising a duct adjacent the base of the housing and said air egress means comprising a duct adjacent the top of said housing with the ducts preferably formed extending across at least part of said front panel in said housing and with said air-flow means comprising a shutter operably associated with at least one of said air ingress and egress means to vary the duct size to said air ingress and said air egress means.

12. A storage heater as claimed in claim 11 wherein said housing comprises an insulated housing.

13. An electric thermal storage heater comprising an insulating housing, air ingress means adjacent the bottom of said housing and air egress means adjacent the top of said housing to allow a flow of air to pass through said housing, a metal heat exchange panel mounted vertically in said housing, an electric heating element embedded in said heat exchange panel, electrical connections to said electric heating element, elongated heat storage units supported in association with either side of said heat exchange panel, said elongated heat storage units containing a storage material relying on the latent heat of fusion for heat storage and air passageways between part of said heat exchange panel and said heat storage units so that in use a flow of air is able to pass through said air ingress means over the heat storage units and part of said heat exchange panel before being discharged from said air egress means.

14. An electric thermal storage heater as claimed in claim 13 wherein a plurality of elongated units in the form of tubes are mounted on either side of said heat exchange panels.

15. A storage heater as claimed in claim 14 wherein the heat storage material contained in said heat storage unit comprises microcrystalline wax.

References Cited

UNITED STATES PATENTS

| | | | |
|---|---|---|---|
| 1,054,409 | 2/1913 | Harrison et al. | 219—370 X |
| 2,007,222 | 7/1935 | Soverhill | 219—365 |
| 2,022,812 | 12/1935 | Roe | 29—365 |
| 2,890,318 | 6/1959 | Kruse | 219—540 |
| 2,904,666 | 9/1959 | Jackson | 219—377 |
| 2,949,679 | 8/1960 | MacCracken et al. | 219—365 |
| 3,275,800 | 9/1966 | Kuoppamaki et al. | 219—365 X |
| 3,283,125 | 11/1966 | Snelling | 29—530 X |
| 3,356,828 | 12/1967 | Furness | 219—378 X |

FOREIGN PATENTS 486,711  11/1953  Italy.

ANTHONY BARTIS, Primary Examiner

C. L. ALBRITTON, Assistant Examiner

U.S. Cl. X.R.

165—104; 219—365, 378